United States Patent
Noon et al.

(10) Patent No.: US 11,629,226 B2
(45) Date of Patent: *Apr. 18, 2023

(54) LAMINATED MULTILAYER POLYMER CONTAINING FILM COMPRISING A COPOLYAMIDE OF A DIAMINE, A DIMER ACID AND A LACTAM

(71) Applicant: BASF SE, Ludwigshafen am Rhein (DE)

(72) Inventors: Eric S Noon, Freeport, TX (US); Joao Costa, Wyandotte, MI (US); Patrick Stephen Gale, Southfield, MI (US); Michael Daniel Doyle, Wyandotte, MI (US); Rolf Minkwitz, Ludwigshafen (DE)

(73) Assignee: BASF SE

( * ) Notice: Subject to any disclaimer, the term of this patent is extended or adjusted under 35 U.S.C. 154(b) by 4 days.

This patent is subject to a terminal disclaimer.

(21) Appl. No.: 16/980,241

(22) PCT Filed: Mar. 6, 2019

(86) PCT No.: PCT/EP2019/055481
§ 371 (c)(1),
(2) Date: Sep. 11, 2020

(87) PCT Pub. No.: WO2019/174976
PCT Pub. Date: Sep. 19, 2019

(65) Prior Publication Data
US 2021/0032405 A1 Feb. 4, 2021

Related U.S. Application Data

(60) Provisional application No. 62/642,269, filed on Mar. 13, 2018.

(51) Int. Cl.
| | | |
|---|---|---|
| C08G 69/36 | (2006.01) | |
| B32B 7/12 | (2006.01) | |
| B32B 15/088 | (2006.01) | |
| B32B 15/09 | (2006.01) | |
| B32B 15/20 | (2006.01) | |
| B32B 27/32 | (2006.01) | |
| B32B 27/34 | (2006.01) | |
| B65D 65/40 | (2006.01) | |
| C08K 3/08 | (2006.01) | |
| C09D 177/08 | (2006.01) | |

(52) U.S. Cl.
CPC ............. *C08G 69/36* (2013.01); *B32B 7/12* (2013.01); *B32B 15/088* (2013.01); *B32B 15/09* (2013.01); *B32B 15/20* (2013.01); *B32B 27/32* (2013.01); *B32B 27/34* (2013.01); *B65D 65/40* (2013.01); *C08K 3/08* (2013.01); *C09D 177/08* (2013.01); *B32B 2250/04* (2013.01); *B32B 2307/54* (2013.01); *B32B 2307/558* (2013.01); *B32B 2307/5825* (2013.01); *B32B 2307/732* (2013.01); *B32B 2439/70* (2013.01); *C08G 2150/00* (2013.01); *C08K 2003/0812* (2013.01)

(58) Field of Classification Search
CPC .............................. B32B 15/088; C08G 69/36
See application file for complete search history.

(56) References Cited

U.S. PATENT DOCUMENTS 4,291,085 A * 9/1981 Ito .............................. B32B 7/02
428/458
2005/0058789 A1 3/2005 Nonaka et al.

FOREIGN PATENT DOCUMENTS

| DE | 28 46 596 A1 | 5/1979 |
| EP | 0 352 562 A2 | 1/1990 |
| JP | 2005-088344 A | 4/2005 |
| JP | 2006-192743 A | 7/2006 |
| WO | 2008/075461 A1 | 6/2008 |

OTHER PUBLICATIONS

JP 2006-192743 Machine Translation (Year: 2006).*
International Search Report dated May 10, 2019 in PCT/EP2019/055481 filed Mar. 6, 2019.
Database WPI, Week 200654, Thomson Scientific, London, GB, Database accession No. AN 2006-525727, XP002790895, 2006, 2 pages.

* cited by examiner

*Primary Examiner* — Zachary M Davis
(74) *Attorney, Agent, or Firm* — Faegre Drinker Biddle & Reath LLP

(57) ABSTRACT

A laminated multilayer polymer containing film (P) comprises at least one layer comprising at least one copolyamide wherein the copolyamide is prepared by polymerizing the following components: (A) 15% to 84% by weight of at least one lactam, (B) 16% to 85% by weight of a monomer mixture (M) comprising the following components: (B1) at least one C32-C40 dimer acid and (B2) at least one C4-C12 diamine, where the percentages by weight of components (A) and (B) are each based on the sum total of the percentages by weight of components (A) and (B) and wherein the laminated multilayer polymer containing film (P) comprises at least one further layer, where the at least one further layer is selected from the group consisting of (i) at least one further polymer (FP) selected from the group consisting of polyolefins, poly(ethylene-vinyl alcohols), poly(ethylene-vinyl acetates), polyethylene terephthalates, polyvinylidene chlorides, maleic anhydride-grafted polyolefins, polyesters and ionomers and (ii) aluminum metal and/or tin metal.

20 Claims, No Drawings

LAMINATED MULTILAYER POLYMER CONTAINING FILM COMPRISING A COPOLYAMIDE OF A DIAMINE, A DIMER ACID AND A LACTAM

DESCRIPTION

The present invention relates to a laminated multilayer polymer film (P), comprising at least one layer comprising at least one copolyamide, wherein the copolyamide has been prepared by polymerizing at least one lactam (A) and a monomer mixture (M). The present invention further relates to a process for producing the laminated multilayer polymer containing film (P) and to the use of the laminated multilayer polymer containing film (P) as packaging film or retortable packaging film.

Polyamides are of particular industrial significance, since they feature very good mechanical properties; more particularly, they have high strength and toughness, good chemical stability and high abrasion resistance. They are used, for example, for production of fishing lines, climbing ropes and carpet backings. In addition, polyamides are employed for production of packaging films and packaging sleeves.

An overview of the use as packaging films and packaging sleeves and on the production thereof is described, for example, in Encyclopedia of Polymer Science and Engineering 2nd ed., vol. 7, pp. 73-127, Vol. 10, pp. 684-695 (John Wiley & Sons, Inc., 1987). However, the polyamide films described therein are very stiff, and have low tear propagation resistance and high density.

For packaging films and packaging sleeves, therefore, copolyamides which combine positive properties of different polyamides are often used. The prior art discloses various copolyamides.

EP 0 352 562 describes films composed of copolyamides, wherein the copolyamides have been prepared from ε-caprolactam and preferably 1 to 10 parts by weight of a dimer acid and a diamine. The copolyamides can then be used for production of flat or blown films. They are likewise suitable for production of composite films.

A disadvantage of the films of copolyamide described in EP 0 352 562 is that they have a relatively low tear propagation resistance, a high modulus of elasticity and a low puncture energy.

DE 28 46 596 describes shaped bodies made from a copolyamide formed from caprolactam, fatty acid dimers and hexamethylenediamine. However, the thermoplastics described cannot be extruded to a film.

It was an object of the present invention to provide a laminated multilayer polymer containing film having improved tear strength, improved puncture properties and increased flexibility.

This object is achieved by a laminated multilayer polymer containing film (P) comprising at least one copolyamide prepared by polymerizing the following components:
  (A) 15% to 84% by weight of at least one lactam,
  (B) 16% to 85% by weight of a monomer mixture (M) comprising the following components:
    (B1) at least one $C_{32}$-$C_{40}$ dimer acid and
    (B2) at least one $C_4$-$C_{12}$ diamine,
  where the percentages by weight of components (A) and (B) are each based on the sum total of the percentages by weight of components (A) and (B) and wherein the laminated multilayer polymer containing film (P) comprises at least one further layer, where the at least one further layer is selected from the group consisting of (i) at least one further polymer (FP) selected from the group consisting of polyolefins, poly(ethylene-vinyl alcohols), poly(ethylene-vinyl acetates), polyethylene terephthalates, polyvinylidene chlorides and maleic anhydride-grafted polyolefins and (ii) aluminum metal and/or tin metal.

The laminated multilayer polymer containing film (P) according to the instant invention is hereinafter also referred to as "laminated film (P)".

It has been found that, surprisingly, the laminated film (P) has high tear propagation resistance both in extrusion direction and at right angles thereto. This is particularly advantageous when the polymer film (P) of the invention is used as packaging film.

Furthermore, the laminated film (P) of the invention has high low-temperature toughness. It is additionally advantageous that the laminated film (P) of the invention is less stiff than the polymer films described in the prior art that comprise a polyamide or a copolyamide. The laminated film (P) of the invention also has a low modulus of elasticity and a high puncture resistance in the dry state. The high puncture resistance is likewise of particular significance when the laminated film (P) is used as packaging film.

The invention is elucidated in detail hereinafter.

Laminated Film (P)

According to the invention, the laminated film (P) comprises at least one layer comprising at least one copolyamide.

In the context of the present invention, "at least one copolyamide" is understood to mean either exactly one copolyamide or a mixture of two or more copolyamides.

The laminated film (P) has a thickness, for example, in the range from 0.1 μm to 1 mm, preferably a thickness in the range from 5 to 500 μm and especially preferably in the range from 20 to 200 μm.

The laminated film (P) may, in addition to the at least one layer comprising at least one copolyamide, comprise at least one further layer, where the at least one further layer is selected from the group consisting of (i) at least one further polymer (FP) selected from the group consisting of polyolefins, poly(ethylene-vinyl alcohols), poly(ethylene-vinyl acetates), polyethylene terephthalates, polyvinylidene chlorides, maleic anhydride-grafted polyolefins, polyesters and ionomers and (ii) aluminum and/or tin metal.

In the context of the present invention, "at least one further polymer (FP)" means either exactly one further polymer (FP) or a mixture of two or more further polymers (FP).

Polymers suitable as the at least one further polymer (FP) are all polymers known to those skilled in the art. It will be apparent that the at least one further polymer (FP) is different than the at least one copolyamide.

Preferably, the at least one further polymer (FP) is selected from the group consisting of polyolefins, poly (ethyl-vinyl alcohols), poly(ethyl-vinyl acetates), polyethylene terephthalates, polyvinylidene chlorides, maleic anhydride-grafted polyolefins, polyesters and ionomers. More preferably, the at least one further polymer (FP) is selected from the group consisting of polyolefins, poly(ethylene-vinyl alcohols), poly(ethylene-vinyl acetates), polyethylene terephthalates and polyvinylidene chlorides. Most preferably, the at least one further polymer (FP) is selected from the group consisting of polyolefins, polyethylene terephthalates and poly(ethylene-vinyl acetates).

Polyolefins as such are known to those skilled in the art. Preferred polyolefins are propylene homo- and copolymers, such as isotactic or syndiotactic propylene homopolymers or copolymers of propylene with ethylene and/or $C_4$-$C_8$-α-olefin (all hereinafter referred to as "polypropylene") low-density polyethylene (LDPE), linear low-density polyethylene (LLDPE) and very low-density polyethylene (VLDPE).

Linear low-density polyethylene (LLDPE) is a copolymer of ethylene and at least one $C_4$-$C_8$-αolefin. Linear low-density polyethylene (LLDPE) features long polymer chains with short side chains. The length of the side chains in linear low-density polyethylene (LLDPE) is typically shorter than in low-density polyethylene (LDPE) and in medium-density polyethylene (MDPE). The melting point of linear low-density polyethylene (LLDPE) is preferably in the range from 110 to 130° C.; its density is in the range from 0.91 to 0.93 g/cm$^3$.

Very low-density polyethylenes (VLDPE) are copolymers of ethylene and at least one $C_4$-$C_8$-αolefin. They typically have a melting point in the range from 110 to 130° C. and a density in the range from 0.86 to <0.91 g/cm$^3$. The proportion of $C_4$-$C_8$-α-olefins in VLDPE is generally higher than in LLDPE.

In the contact of the present invention, "$C_4$-$C_8$-α-olefin" is understood to mean linear and branched, preferably linear, alkylenes having 4 to 8 carbon atoms that are unsaturated in the α position, i.e. have a C—C double bond in the a position. Examples of these are 1-butene, 1pentene, 1-hexene, 1-heptene and 1-octene. 1-Butene, 1-hexene and 1-octene are preferred.

Preferred poly(ethylene-vinyl acetates) are copolymers of ethylene with vinyl acetate. For example, they are prepared using in the range from 82% to 99.9% by weight of ethylene and in the range from 0.1% to 18% by weight of vinyl acetate, preferably in the range from 88% to 99.9% by weight of ethylene and in the range from 0.1% to 12% by weight of vinyl acetate.

Preferred poly(ethylene-vinyl alcohols) are obtainable by complete or partial hydrolysis of the above-described poly(ethylene-vinyl acetates). For example, the poly(ethylene-vinyl alcohols) comprise in the range from 50 to 75 mol % of ethylene and in the range from 25 to 50 mol % of vinyl alcohol, based on the total molar amount of the poly(ethylene-vinyl alcohols).

The at least one further layer may comprise (ii) aluminum and/or tin metal, preferably aluminum metal. In an preferred mode aluminum metal is present in the further layer. Usually the aluminum metal and/or tin metal are in the shape of a foil or sheet. In a further preferred mode the further layer comprising aluminum metal and/or tin metal is located in the laminated film (P) as inner layer or inner layers.

Preferred Laminated Films (P) are the Following:

Laminated films (P) comprising at least one outer layer comprising a polyolefine and at least one layer comprising aluminum and/or tin metal.

Laminated films (P) comprising one outer layer consisting essentially of polypropylene as polyolefine, an adjacent next layer or layers comprising the copolyamide according to the invention, a further layer of aluminum adjacent to the copolyamide layer and finally adjacent to the aluminum layer a layer of polyethylene terephthalate. More preferred laminated films (P) comprise the layer of polypropylene, most preferably sealable polypropylene, in contact with a material, preferably food, for example in laminated films (P) for food packaging.

In the context of the present invention the term "layer" in relation to laminated multilayer polymer containing film (P) means either (i) a single layer, generally an extruded film, of the at least one copolyamide and/or a single layer, generally an extruded film, of the at least one further polymer (FP) and/or a single layer, generally in the form of a rolled foil or sheet, of aluminum and/or tin metal or (ii) more than one layers, generally co-extruded films, of the at least one copolyamide and/or more than one layers, generally co-extruded films, of the at least one further polymer (FP) and/or a more than one layers, generally in the form of a rolled foil or sheet, of aluminum metal and/or tin metal.

In the context of the present invention, "at least one further layer" means either exactly one further layer or two or more further layers. Two or more further layers are preferred.

If the laminated film (P) comprises at least one first layer comprising the at least one copolyamide, and at least one further layer comprising the at least one further polymer (FP), the laminated film (P) is also referred to as a laminated multilayer film.

As described above, the laminated film (P) typically has a thickness in the range from 0.1 μm to 1 mm, preferably in the range from 5 to 500 μm and especially preferably in the range from 10 to 200 μm. In case one or more layers of the laminated film (P) are made up from more than one single layer, generally extruded films, of the copolyamide according to the invention, and/or the further polymer (FP) and/or the aluminum and or tin metal, said single layers, usually have a thickness in the range of from 5 to 150 μm.

If the polymer film (P) is a multilayer film, the thickness of the individual layers of the polymer film (P), i.e. the thickness of the at least one first layer comprising the at least one copolyamide, and the thickness of the at least one further layer comprising the at least one further polymer (FP) and/or aluminum metal and/or tin metal, is typically less than the thickness of the laminated film (P). The sum total of the thicknesses of the individual layers in that case generally corresponds to the thickness of the laminated film (P).

The laminated film (P) may also comprise additives. Additives of this kind are known to those skilled in the art and are selected, for example, from the group consisting of stabilizers, dyes, antistats, tackifiers, anti-blockers, processing auxiliaries, antioxidants, light stabilizers, UV absorbers, lubricants and nucleating aids.

Suitable dyes are organic and inorganic pigments, for example titanium dioxide provided with a size. Suitable tackifiers are, for example, polyisobutylene (PIB) or ethyl-vinyl acetate (EVA). Suitable antiblocking agents are, for example, silicon dioxide particles or calcium carbonate particles. Suitable light stabilizers are, for example, what are called HALS (hindered amine light stabilizers). Processing auxiliaries or lubricants used may, for example, be ethylen-ebisstearamide (EBS) wax. Nucleating aids may, for example, be all kinds of organic or inorganic crystallization nucleators, for example talc.

The additives may either be present either in the at least one first layer or in the at least one further layer. They may be present in just one of these layers; it is likewise possible that they are present in each of these layers.

Copolyamide

According to the invention, the laminated film (P) comprises at least one copolyamide prepared by polymerizing the following components:
(A) 15% to 84% by weight of at least one lactam,
(B) 16% to 85% by weight of a monomer mixture (M) comprising the following components:
(B1) at least one $C_{32}$-$C_{40}$ dimer acid and
(B2) at least one $C_4$-$C_{12}$ diamine, where the percentages by weight of components (A) and (B) are each based on the sum total of the percentages by weight of components (A) and (B).

The terms "component (A)" and "at least one lactam" are used synonymously in the context of the present invention and therefore have the same meaning.

The same applies to the terms "component (B)" and "a monomer mixture (M)". These terms are likewise used synonymously in the context of the present invention and therefore have the same meaning.

In the context of the present invention, "at least one lactam" means either exactly one lactam or a mixture of two or more lactams. Preference is given to exactly one lactam.

According to the invention, the at least one copolyamide has been prepared by polymerizing 15% to 84% by weight of component (A) and 16% to 85% by weight of component (B); preferably, the copolyamide has been prepared by polymerizing 40% to 83% by weight of component (A) and from 17% to 60% by weight of component (B); especially preferably, the at least one copolyamide has been prepared by polymerizing from 60% to 80% by weight of component (A) and 20% to 40% by weight of component (B), where the percentages by weight of components (A) and (B) are each based on the sum total of the percentages by weight of components (A) and (B).

Preferably, the sum total of the percentages by weight of components (A) and (B) adds up to 100% by weight.

It will be apparent that the percentages by weight of components (A) and (B) are based on the percentages by weight of components (A) and (B) prior to polymerization, i.e. when components (A) and (B) have not yet reacted with one another. During the polymerization, the weight ratio of components (A) and (B) may change.

According to the invention, the copolyamide is prepared by polymerizing components (A) and (B). The polymerization of components (A) and (B) is known to those skilled in the art. Typically, the polymerization of components (A) with (B) is a condensation reaction. During the condensation reaction, component (A) reacts with components (B1) and (B2) present in component (B) and with any component (B3) as described further down that may likewise be present in component (B). This forms amide bonds between the individual components. Typically, component (A) is at least partly in open-chain form during the polymerization, i.e. in the form of an amino acid.

The polymerization of components (A) and (B) may take place in the presence of a catalyst. Suitable catalysts are all catalysts that are known to those skilled in the art and catalyze the polymerization of components (A) and (B). Catalysts of this kind are known to those skilled in the art. Preferred catalysts are phosphorus compounds, for example sodium hypophosphite, phosphorous acid, triphenylphosphine or triphenyl phosphite.

The polymerization of components (A) and (B) forms the copolyamide, which therefore receives structural units derived from component (A) and structural units derived from component (B). Structural units derived from component (B) comprise structural units derived from components (B1) and (B2) and from any component (B3).

The polymerization of components (A) and (B) forms the copolyamide as the copolymer. The copolymer may be a random copolymer; it is likewise possible that it is a block copolymer.

In a block copolymer, there is formation of blocks of units derived from component (B) and of blocks of units derived from component (A). These alternate. In the case of a random copolymer, there is alternation of structural units derived from component (A) with structural units derived from component (B). This alternation is random; for example, two structural units derived from component (B) may be followed by one structural unit derived from component (A), which is in turn followed by one structural unit derived from component (B), which is then followed by a structural unit comprising three structural units derived from component (A).

Preferably, the at least one copolyamide is a random copolymer.

The present invention therefore also provides a laminated film (P) in which the at least one copolyamide is a random copolymer.

The preparation of the at least one copolyamide preferably comprises the following steps:
 a) polymerizing components (A) and (B) to obtain at least one first copolyamide,
 b) pelletizing the at least one first copolyamide obtained in step a) to obtain at least one pelletized copolyamide,
 c) extracting the at least one pelletized copolyamide obtained in step b) with water to obtain at least one extracted copolyamide,
 d) drying the at least one extracted copolyamide obtained in step c) at a temperature ($T_T$) to obtain the at least one copolyamide.

The present invention therefore also provides a laminated film (P) in which the copolyamide is prepared in a process comprising the following steps:
 a) polymerizing components (A) and (B) to obtain at least one first copolyamide,
 b) pelletizing the at least one first copolyamide obtained in step a) to obtain at least one pelletized copolyamide,
 c) extracting the at least one pelletized copolyamide obtained in step b) with water to obtain at least one extracted copolyamide,
 d) drying the at least one extracted copolyamide obtained in step c) at a temperature ($T_T$) to obtain the at least one copolyamide.

The polymerization in step a) can take place in any reactors known to those skilled in the art. Preference is given to stirred tank reactors. It is additionally possible to use auxiliaries known to those skilled in the art to improve the reaction regime, for example defoamers such as polydimethylsiloxane (PDMS).

In step b), the at least one first copolyamide obtained in step a) can be pelletized by any methods known to those skilled in the art, for example by means of strand pelletization or underwater pelletization.

The extraction in step c) can be effected by any methods known to those skilled in the art.

During the extraction in step c), by-products that are typically formed during the polymerization of components (A) and (B) in step a) are extracted from the at least one pelletized copolyamide.

In step d), the at least one extracted copolyamide obtained in step c) is dried. Methods of drying are known to those skilled in the art. According to the invention, the at least one extracted copolyamide is dried at a temperature ($T_T$). The temperature ($T_T$) is preferably above the glass transition temperature ($T_{G(C)}$) of the at least one copolyamide and below the melting temperature ($T_{M(C)}$) of the at least one copolyamide.

The drying in step d) is typically effected for a period of time in the range from 1 to 100 hours, preferably in the range from 2 to 50 hours and especially preferably in the range from 3 to 40 hours.

It is envisaged that the drying in step d) will further increase the molecular weight of the at least one copolyamide.

The at least one copolyamide typically has a glass transition temperature ($T_{G(C)}$). The glass transition temperature ($T_{G(C)}$) is, for example, in the range from 20 to 50° C., preferably in the range from 23 to 47° C. and especially preferably in the range from 25 to 45° C., determined according to ISO 11357-2: 2014.

The present invention therefore also provides a laminated film (P) in which the at least one copolyamide has a glass transition temperature ($T_{G(C)}$), where the glass transition temperature ($T_{G(C)}$) is in the range from 20 to 50° C.

The glass transition temperature ($T_{G(C)}$) of the at least one copolyamide, in accordance with ISO 11357-2: 2014, in the context of the present invention, is based on the glass transition temperature ($T_{G(C)}$) of the dry copolyamide.

In the context of the present invention, "dry" means that the at least one copolyamide comprises less than 1% by weight, preferably less than 0.5% by weight and especially preferably less than 0.1% by weight of water, based on the total weight of the at least one copolyamide. More preferably, "dry" means that the at least one copolyamide does not comprise any water and most preferably that the at least one copolyamide does not comprise any solvent.

The at least one copolyamide additionally has a melting temperature ($T_{M(C)}$). The melting temperature ($T_{M(C)}$) of the at least one copolyamide is, for example, in the range from 150 to 210° C., preferably in the range from 160 to 205° C. and especially preferably in the range from 160 to 200° C., determined according to ISO 11357-3: 2014.

The present invention therefore also provides a laminated film (P) in which the at least one copolyamide has a melting temperature ($T_{M(C)}$), where the melting temperature ($T_{M(C)}$) is in the range from 150 to 210° C.

The at least one copolyamide generally has a viscosity number ($T_{M(C)}$) in the range from 150 to 300 mL/g, determined in a 0.5% by weight solution of the at least one copolyamide in a mixture of phenol/o-dichlorobenzene in a weight ratio of 1:1.

Preferably, the viscosity number ($VN_{(C)}$) of the at least one copolyamide is in the range from 160 to 290 mL/g and more preferably in the range from 170 to 280 mL/g, determined in a 0.5% by weight solution of the at least one copolyamide in a mixture of phenol/o-dichlorobenzene in a weight ratio of 1:1.

The present invention therefore also provides a laminated film (P) in which the at least one copolyamide has a viscosity number ($VN_{(C)}$) in the range from 150 to 300 mL/g, determined in a 0.5% by weight solution of the at least one copolyamide in a mixture of phenol/o-dichlorobenzene in a weight ratio of 1:1.

Component (A)

Component (A) is at least one lactam.

Lactams are known as such to those skilled in the art. Preference is given in accordance with the invention to lactams having 4 to 12 carbon atoms.

In the context of the present invention, lactams are understood to mean cyclic amides having, in the ring, preferably 4 to 12 and more preferably 5 to 8 carbon atoms.

Suitable lactams are selected, for example, from the group consisting of 3-aminopropanolactam (propio-3-lactam; β-lactam; β-propiolactam), 4-aminobutanolactam (butyro-4-lactam; γ-lactam; γ-butyrolactam), 5-aminopentanolactam (2-piperidinone; δ-lactam; δ-valerolactam), 6-aminohexanolactam (hexano-6-lactam: ε-lactam; ε-caprolactam), 7-aminoheptanolactam (heptano-7-lactam; ζ-lactam; ζ-heptanolactam), 8-aminooctanolactam (octano-8-lactam; η-lactam; η-octanolactam), 9-aminononanolactam (nonano-9-lactam; θ-lactam; θ-nonanolactam), 10-aminodecanolactam (decano-10-lactam; ω-decanolactam), 11-aminoundecanolactam (undecano -11-lactam; ω-undecanolactam) and 12-aminododecanolactam (dodecano-12-lactam; ω-dodecanolactam).

The present invention therefore also provides a laminated film (P) in which component (A) is selected from the group consisting of 3-aminopropanolactam, 4-aminobutanolactam, 5-aminopentanolactam, 6-aminohexanolactam, 7-aminoheptanolactam, 8-aminooctanolactam, 9-aminononanolactam, 10-aminodecanolactam, 11-aminoundecanolactam and 12-aminododecanolactam.

The lactams may be unsubstituted or at least monosubstituted. If at least monosubstituted lac-tams are used, these may bear, on the nitrogen atom and/or on the carbon atoms of the ring, one, two or more substituents independently selected from the group consisting of $C_1$- to $C_{10}$-alkyl, $C_5$- to $C_6$-cycloalkyl and $C_5$- to $C_{10}$-aryl.

Suitable $C_1$- to $C_{10}$-alkyl substituents are, for example, methyl, ethyl, propyl, isopropyl, n-butyl, sec-butyl and tert-butyl. An example of a suitable $C_5$- to $C_6$-cycloalkyl substituent is cyclohexyl. Preferred $C_5$- to $C_{10}$-aryl substituents are phenyl and anthranyl. Preference is given to using unsubstituted lactams, preference being given to γ-lactam (γ-butyrolactam), δ-lactam (δ-valerolactam) and ε-lactam (ε-caprolactam). Particular preference is given to δ-lactam (δ-valerolactam) and ε-lactam (ε-caprolactam), especial preference to ε-caprolactam.

Monomer Mixture (M)

According to the invention, component (B) is a monomer mixture (M). The monomer mixture (M) comprises components (B1), at least one $C_{32}$-$C_{40}$ dimer acid and (B2) at least one $C_4$-$C_{12}$ diamine.

In the context of the present invention, a monomer mixture (M) is understood to mean a mixture of two or more monomers, where at least components (B1) and (B2) are present in the monomer mixture (M).

In the context of the present invention, the terms "component (B1)" and "at least one $C_{32}$-$C_{40}$ dimer acid" are used synonymously and therefore have the same meaning. The same applies to the terms "component (B2)" and "at least one $C_4$-$C_{12}$ diamine". These terms are likewise used synonymously in the context of the present invention and therefore have the same meaning.

The monomer mixture (M) comprises, for example, in the range from 45 to 55 mol % of component (B1) and in the range from 45 to 55 mol % of component (B2), based in each case on the sum total of the molar percentages of components (B1) and (B2), preferably based on the total molar amount of component (B).

Preferably, component (B) comprises in the range from 47 to 53 mol % of component (B1) and in the range from 47 to 53 mol % of component (B2), based in each case on the sum total of the molar percentages of components (B1) and (B2), preferably based on the total molar amount of component (B).

More preferably, component (B) comprises in the range from 49 to 51 mol % of component (B1) and in the range from 49 to 51 mol % of component (B2), based in each case on the sum total of the molar percentages of components (B1) and (B2), preferably based on the total molar amount of component (B).

The present invention therefore also provides a laminated film (P) in which component (B) comprises in the range from 45 to 55 mol % of component (B1) and in the range from 45 to 55 mol % of component (B2), based in each case on the total molar amount of component (B).

The sum total of the molar percentages of components (B1) and (B2) present in component (B) typically adds up to 100 mol %.

Component (B) may also additionally comprise a component (B3), at least one $C_4$-$C_{20}$ diacid.

The present invention therefore also provides a laminated film (P) in which component (B) additionally comprises a component (B3), at least one $C_4$-$C_{20}$ diacid.

The terms "component (B3)" and "at least one $C_4$-$C_{20}$ diacid" are used synonymously in the context of the present invention and therefore have the same meaning.

When component (B) additionally comprises component (B3), it is preferable that component (B) comprises in the range from 25 to 54.9 mol % of component (B1), in the range from 45 to 55 mol % of component (B2) and in the range from 0.1 to 25 mol % of component (B3), based in each case on the total molar amount of component (B).

More preferably, component (B) in that case comprises in the range from 13 to 52.9 mol % of component (B1), in the range from 47 to 53 mol % of component (B2) and in the range from 0.1 to 13 mol % of component (B3), based in each case on the total molar amount of component (B).

Most preferably, component (B) in that case comprises in the range from 7 to 50.9 mol % of component (B1), in the range from 49 to 51 mol % of component (B2) and in the range from 0.1 to 7 mol % of component (B3), based in each case on the total molar amount of component (B).

When component (B) additionally comprises component (B3), the molar percentages of components (B1), (B2) and (B3) typically add up to 100 mole percent.

The monomer mixture (M) may additionally comprise water.

Components (B1) and (B2) and optionally (B3) of component (B) may react with one another to obtain amides. This reaction is known as such to those skilled in the art. Therefore, component (B) may comprise components (B1) and (B2) and optionally (B3) in fully reacted form, in partly reacted form or in unreacted form. Preferably, component (B) comprises components (B1) and (B2) and optionally (B3) in unreacted form.

In the context of the present invention, "in unreacted form" thus means that component (B1) is present in the form of the at least one $C_{32}$-$C_{40}$ dimer acid and component (B2) in the form of the at least one $C_4$-$C_{12}$ diamine and, if appropriate, component (B3) in the form of the at least one $C_4$-$C_{20}$ diacid.

If components (B1) and (B2) and, if appropriate, (B3) have at least partly reacted with one another, components (B1) and (B2) and, if appropriate, (B3) are at least partly in amide form.

Component (B1)

According to the invention, component (B1) is at least one $C_{32}$-$C_{40}$ dimer acid.

In the context of the present invention, "at least one $C_{32}$-$C_{40}$ dimer acid" means either exactly one $C_{32}$-$C_{40}$ dimer acid or a mixture of two or more $C_{32}$-$C_{40}$ dimer acids.

Dimer acids are also referred to as dimer fatty acids. $C_{32}$-$C_{40}$ dimer acids are known as such to those skilled in the art and are typically prepared by dimerization of unsaturated fatty acids. This dimerization can be catalyzed, for example, by aluminas.

Suitable unsaturated fatty acids for preparation of the at least one $C_{32}$-$C_{40}$ dimer acid are known to those skilled in the art and are, for example, unsaturated $C_{16}$ fatty acids, unsaturated $C_{18}$ fatty acids and unsaturated $C_{20}$ fatty acids.

Preferably, component (B1) is therefore prepared proceeding from unsaturated fatty acids selected from the group consisting of unsaturated $C_{16}$ fatty acids, unsaturated $C_{18}$ fatty acids and unsaturated $C_{20}$ fatty acids, particular preference being given to the unsaturated $C_{18}$ fatty acids.

The present invention therefore also provides a laminated film (P) in which component (B1) is prepared proceeding from unsaturated fatty acids selected from the group consisting of unsaturated $C_{16}$ fatty acids, unsaturated $C_{18}$ fatty acids and unsaturated $C_{20}$ fatty acids.

An example of a suitable unsaturated $C_{16}$ fatty acid is palmitoleic acid ((9Z)-hexadeca-9-enoic acid).

Suitable unsaturated $C_{18}$ fatty acids are selected, for example, from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z,12Z)-octadeca-9,12-dienoic acid), alpha-linolenic acid ((9Z,12Z,15Z)-octadeca-9,12,15-trienoic acid), gamma-linolenic acid ((6Z,9Z,12Z)-octadeca-6,9,12-trienoic acid), calendic acid ((8E,10E,12Z)-octadeca-8,10,12-trienoic acid), punicic acid ((9Z,11E,13Z)-octadeca-9,11,13-trienoic acid), alpha-eleostearic acid ((9Z,11E,13E)-octadeca-9,11,13-trienoic acid) and beta-eleostearic acid ((9E,11E,13E)-octadeca-9,11,13-trienoic acid). Particular preference is given to unsaturated $C_{18}$ fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z,12Z)-octadeca-9,12-dienoic acid).

Suitable unsaturated $C_{20}$ fatty acids are selected, for example, from the group consisting of gadoleic acid ((9Z)-eicosa-9-enoic acid), eicosenoic acid ((11Z)-eicosa-11-enoic acid), arachidonic acid ((5Z,8Z,11Z,14Z)-eicosa-5,8,11,14-tetraenoic acid) and timnodonic acid ((5Z,8Z,11Z,14Z,17Z)-eicosa-5,8,11,14,17-pentaenoic acid).

Component (B1) is especially preferably at least one $C_{36}$ dimer acid.

The at least one $C_{36}$ dimer acid is preferably prepared proceeding from unsaturated $C_{18}$ fatty acids. More preferably, the $C_{36}$ dimer acid is prepared proceeding from $C_{18}$ fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid) and linoleic acid ((9Z,12Z)-octadeca-9,12-diensäure).

In the preparation of component (B1) from unsaturated fatty acids, trimer acids may additionally form; residues of unreacted unsaturated fatty acid may also remain.

The formation of trimer acids is known to those skilled in the art.

Preferably in accordance with the invention, component (B1) comprises not more than 0.5% by weight of unreacted unsaturated fatty acid and not more than 0.5% by weight of trimer acid, more preferably not more than 0.2% by weight of unreacted unsaturated fatty acid and not more than 0.2% by weight of trimer acid, based in each case on the total weight of component (B1).

Dimer acids (also known as dimerized fatty acids or dimer fatty acids) thus refer generally and especially in the context of the present invention to mixtures that are prepared by oligomerization of unsaturated fatty acids. They are preparable, for example, by catalytic dimerization of unsaturated fatty acids from vegetable sources, in which case the starting materials used are especially unsaturated $C_{16}$ to $C_{20}$ fatty acids. The addition is primarily of the Diels-Alder type, and the result, according to the number and position of the double bonds in the fatty acids used for preparation of the dimer acids, is mixtures of primarily dimeric products having cycloaliphatic, linear aliphatic, branched aliphatic and also $C_6$-aromatic hydrocarbyl groups between the carboxy) groups. According to the mechanism and/or any subsequent hydrogenation, the aliphatic radicals may be saturated or unsaturated, and the proportion of aromatic groups may also vary. The radicals between the carboxylic acid groups in that case comprise, for example, 32 to 40 carbon atoms. Preference is given to using fatty acids having 18 carbon atoms for the preparation, such that the dimeric product thus has 36 carbon atoms. Preferably, the radicals that connect the carboxyl groups of the dimer fatty acids do not have any unsaturated bonds or any aromatic hydrocarbyl radicals.

In the context of the present invention, $C_{18}$ fatty acids are thus preferably used in the preparation. Particular preference is given to using linolenic acid, linoleic acid and/or oleic acid.

Depending on the reaction regime, the oligomerization described above gives rise to mixtures comprising mainly dimeric molecules, but also trimeric molecules and also monomeric molecules and other by-products. Purification is typically by distillative means. Commercial dimer acids generally comprise at least 80% by weight of dimeric molecules, up to 19% by weight of trimeric molecules and not more than 1% by weight of monomeric molecules and other by-products.

It is preferable to use dimer acids consisting of dimeric fatty acid molecules to an extent of at least 90% by weight, preferably to an extent of at least 95% by weight, even more preferably to an extent of at least 98% by weight.

The proportions of monomeric, dimeric and trimeric molecules and other by-products in the dimer acids can be determined, for example, by means of gas chromatography (GC). The dimer acids here, prior to the GC analysis, are converted to the corresponding methyl esters via the boron trifluoride method (cf. DIN EN ISO 5509) and then analyzed by means of GC.

A fundamental characteristic of "dimer acids" in the context of the present invention is thus that the preparation thereof comprises the oligomerization of unsaturated fatty acids. This oligomerization gives rise primarily to dimeric products, i.e. preferably to an extent of at least 80% by weight, more preferably to an extent of at least 90% by weight, even more preferably to an extent of at least 95% by weight and especially to an extent of at least 98% by weight. The fact that the oligomerization thus gives rise predominantly to dimeric products comprising exactly two fatty acid molecules justifies this name, which is in common use in any case. An alternative expression for the term "dimer acids" in question is thus "mixture comprising dimerized fatty acids".

The dimer acids to be used are obtainable as commercial products. Examples of these include Radiacid 0970, Radiacid 0971, Radiacid 0972, Radiacid 0975, Radiacid 0976 and Radiacid 0977 from Oleon, Pripol 1006, Pripol 1009, Pripol 1012, and Pripol 1013 from Croda, Empol 1008, Empol 1012, Empol 1061 and Empol 1062 from BASF SE, and Unidyme 10 and Unidyme TI from Arizona Chemical.

Component (B1) has an acid number, for example, in the range from 190 to 200 mg KOH/g.

Component (B2)

According to the invention, component (B2) is at least one $C_4$-$C_{12}$ diamine.

In the context of the present invention, "at least one $C_4$-$C_{12}$ diamine" means either exactly one $C_4$-$C_{12}$ diamine or a mixture of two or more $C_4$-$C_{12}$ diamines.

In the context of the present compound, "$C_4$-$C_{12}$ diamine" is understood to mean aliphatic and/or aromatic compounds having four to twelve carbon atoms and two amino groups (—$NH_2$ groups). The aliphatic and/or aromatic compounds may be unsubstituted or additionally at least monosubstituted. If the aliphatic and/or aromatic compounds are additionally at least monosubstituted, they may bear one, two or more substituents that do not take part in the polymerization of components (A) and (B). Substituents of this kind are, for example, alkyl or cycloalkyl substituents. These are known as such to those skilled in the art. The at least one $C_4$-$C_{12}$ diamine is preferably unsubstituted.

Suitable components (B2) are selected, for example, from the group consisting of 1,4-diaminobutane (butane-1,4-diamine; tetramethylenediamine; putrescine), 1,5-diaminopentane (pentamethylenediamine; pentane-1,5-diamine; cadaverine), 1,6-diaminohexane (hexamethylenediamine; hexane-1,6-diamine), 1,7-diaminoheptane, 1,8-diaminooctane, 1,9-diaminononane, 1,10-diaminodecane (decamethylenediamine), 1,11-diaminoundecane (undecamethylenediamine) and 1,12-diaminododecane (dodecamethylenediamine).

Preferably, component (B2) is selected from the group consisting of tetramethylenediamine, pentamethylenediamine, hexamethylenediamine, decamethylenediamine and dodecamethylenediamine.

The present invention therefore also provides a laminated film (P) in which component (B2) is selected from the group consisting of tetramethylenediamine, pentamethylenediamine, hexamethylenediamine, decamethylenediamine and dodecamethylenediamine.

Production of the Laminated Film (P)

The process for producing the laminated film (P) comprises the steps of i) preparing at least two films, and ii) laminating the at least two films, wherein at least one film in step i) is obtained from a copolyamide as defined herein and the other film or films in step i) is/are obtained from a component selected from the group consisting of a) at least one further polymer (FP) of polyolefins, poly(ethylene-vinyl alcohols), poly(ethylene-vinyl acetates), polyethylene terephthalates, polyvinylidene chlorides, maleic anhydride-grafted polyolefins, polyesters and ionomers and b) aluminum metal and/or tin metal.

In a preferred embodiment the other film or films in step i) is/are obtained from a component selected from the group consisting of a) at least one further polymer (FP) of polyolefins, for example polypropylene, polyethylene terephthalates, and b) aluminum metal and/or tin metal, preferably aluminum metal.

In a further preferred embodiment the other film or films in step i) comprise a) at least one further polymer (FP) of polyolefins, for example polypropylene, polyethylene terephthalates, and b) aluminum metal.

The preparation of films from a copolyamide as defined herein and/or the at least one further polymer (FP) of polyolefins, poly(ethylene-vinyl alcohols), poly(ethylene-vinyl acetates), polyethylene terephthalates, polyvinylidene chlorides, maleic anhydride-grafted polyolefins, polyesters and ionomers are well known in the art. For example said films or polymer layers may be obtained by film extrusion or co-extrusion process, casting process, blowing process or a biaxially orientation process, usually in the course of an extrusion process. The biaxially orientation process, usually in the course of an extrusion process is preferred in case of polyethylene terephthalates, yielding so called biaxially oriented PET films ("boPET films").

The preparation of films from a copolyamide as defined herein and/or the at least one further polymer (FP) of polyolefins, poly(ethylene-vinyl alcohols), poly(ethylene-vinyl acetates), polyethylene terephthalates, polyvinylidene chlorides, maleic anhydride-grafted polyolefins, polyesters and ionomers may include stretching or biaxial orientation.

The stretching can be effected by any methods known to those skilled in the art.

For example, the polymer film of the said polymers can be stretched by guiding it over at least one roll, preferably a roll system, or by extending it widthwise. If said polymer film is obtained in the form of a tube, it is likewise possible that said polymer film is stretched by blowing air into the tube of the said polymer film and hence stretching the polymer film. It will be appreciated that combinations of the methods are also possible.

When the said polymer film is guided over at least one roll, preferably through a roll system, the polymer film is stretched in extrusion direction, i.e. lengthwise. If the said polymer film, by contrast, is extended widthwise, it is stretched at right angles to extrusion direction.

If the said polymer film, for stretching, is guided over at least one roll, preferably through a roll system, the polymer chains of the at least one copolyamide or of any at least one further polymer (FP) are aligned parallel to the direction in which stretching is effected. The stretched polymer film (SP) obtained is then uniaxially oriented. The stretched polymer film obtained (SP) is likewise uniaxially oriented when the said polymer film, for stretching, is extended widthwise. In that case too, the polymer chains of the at least one copolyamide and of any at least one further polymer (FP) are aligned parallel to the direction in which stretching is effected.

"Uniaxially oriented" means that the polymer chains are aligned essentially in one direction.

If the said polymer film, for stretching, is guided over a roll system and additionally extended widthwise, the polymer chains of the at least one copolyamide and of any at least one further polymer (FP) are aligned parallel to both directions in which stretching is effected. The stretched polymer film (SP) obtained is then biaxially oriented.

"Biaxially oriented" means that the polymer chains are aligned essentially in two different directions, preferably at right angles to one another.

If the said polymer film is obtained in tubular form and the polymer film is stretched by blowing air into the tube of the polymer film, the stretched polymer film (SP) obtained is uniaxially oriented.

If the above-described processes for stretching the said polymer film are combined, the polymer film is thus obtained, for example, in tubular form and the polymer film is stretched by blowing air into the tube of the polymer film and simultaneously guided over rolls and likewise stretched; thus, the stretched polymer film (SP) obtained is biaxially oriented.

The said polymer film is typically stretched at a temperature above the glass transition temperature ($T_{G(C)}$) of the at least one copolyamide and below the melting temperature ($T_{M(C)}$) of the at least one copolyamide. It the said polymer film is a multilayer film, it is also preferable that the polymer film is stretched at a temperature below the melting temperature ($T_{M(FP)}$) of the at least one further polymer (FP), especially preferably at a temperature below the melting temperature of the at least one further polymer (FP) having the lowest melting temperature.

The layers of aluminum metal or tin metal in the laminated film (P) are usually obtained by applying a rolled foil or sheet, of aluminum metal and/or tin metal.

In the context of the present invention the term "layer" in relation to laminated multilayer polymer containing film (P) means either (i) a single layer, generally an extruded film, of the at least one copolyamide and/or a single layer, generally an extruded film, of the at least one further polymer (FP) and/or a single layer, generally in the form of a rolled foil or sheet, of aluminum and/or tin metal or (ii) more than one layers, generally co-extruded films, of the at least one copolyamide and/or more than one layers, generally co-extruded films, of the at least one further polymer (FP) and/or a more than one layers, generally in the form of a rolled foil or sheet, of aluminum metal and/or tin metal.

Laminating of films, generally polymer films, mostly thermoplastic polymer films, is well known in the art.

Lamination is usually understood as the bonding of substrates of large surface area, more particularly for the production of composite films using suitable lamination adhesives including adhesive polymers which may be formulated with typical auxiliaries. In the process for producing composite films, at least two films are usually bonded with one another using a lamination adhesive.

In a suitable mode for producing the laminated film (P) the lamination adhesive is usually applied to the large-surface-area substrates to be bonded such as films from a copolyamide as defined herein and/or films of the at least one further polymer (FP) of polyolefins, poly(ethylene-vinyl alcohols), poly(ethylene-vinyl acetates), polyethylene terephthalates, polyvinylidene chlorides, maleic anhydride-grafted polyolefins, polyesters and ionomers and/or aluminum metal and/or tin metal, preferably with an adhesive layer thickness of 0.1 to 20 $g/m^2$, more preferably 1 to 7 $g/m^2$, by means, for example, of knife coating, spreading, etc. Typical coating techniques may be employed, examples being roller coating, reverse roller coating, gravure roller coating, reverse gravure roller coating, brush coating, rod coating, spray coating, air brush coating, meniscus coating, curtain coating or dip coating. After a short time for the water of the dispersion or organic solvents of the lamination adhesives to evaporate (usually after 1 to 60 seconds), the coated substrate may then be laminated with a second substrate, the temperature can be, for example, 20 to 200° C., preferably 20 to 100° C., and the pressure can be, for example, 100 to 3000 $kN/m^2$, preferably 300 to 2000 $kN/m^2$.

The lamination adhesive may be employed as a one-component composition, i.e. without additional crosslinking agents or as a two-component composition including at least one crosslinking agent such as for example isocyanate crosslinkers. At least one of the films may be metalized or printed on the side that is coated with adhesive. The stated films and foils may be bonded with one another or with a foil or film of a different type—for example, polymer films with metal foils, different polymer films with one another, etc. The stated foils and films may also, for example, be printed with printing inks.

The lamination adhesives usefull for the lamination process according to the invention are the ones known in the art and they are preferably non-tacky. Lamination adhesives are distinguished from pressure-sensitive adhesive in that they have no or only very low tack at room temperature and are applied with pressure and at elevated temperatures. The tack as measured as so called Loop Tack is preferably less than 1,7 N/25 mm (adhesive coating weight of 20 μm on a 12 μm PET-film, measured on steel at 20° C. with a delamination speed of 300 mm/min).

The lamination adhesives usefull for the lamination process according to the invention are for example based on adhesive polymers dissolved in organic solvents or in the form of aqueous dispersions comprising at least one adhesive polymer dispersed in aqueous medium. Preferred dispersion adhesives are aqueous dispersions of polyacrylates or aqueous dispersions of polyurethanes. The adhesive polymers of the lamination adhesives may be polymers obtainable by radical polymerization of ethylenically unsaturated compounds (monomers) or may be polymers obtainable by polycondensation, such as polyurethanes, for example. Suitable adhesive polymers are more particularly poly(meth) acrylates, ethylene/vinyl acetate copolymer, polyurethanes, polyamide resins, saturated polyesters, polyolefins, styrene/butadiene block copolymers, styrene/isoprene block copolymers, polyimides, PVC, and polyvinylpyrrolidone.

The laminated film (P) of the invention is preferably used as packaging film.

For example, the laminated film (P) of the invention can be used as tubular pouch packaging, as laterally sealed pouch packaging, as thermoformed packaging, for closable pouches and/or as cushion packaging. Preferably in case the laminated film (P) contains aluminum metal, usually as at least one inner layer(s) of the laminated film (P), it is used as retortable packaging film.

The present invention is elucidated in detail hereinafter with reference to examples.

EXAMPLES

The properties of the polymer films (P) were determined as follows:

The viscosity number of copolyamides comprising units derived from a $C_{32}$-$C_{40}$ dimer acid was determined in a 0.5% by weight solution of phenol/o-dichlorobenzene in a weight ratio of 1:1 at 25° C.

The viscosity number of polyamides that do not comprise any units derived from a $C_{32}$-$C_{40}$ dimer acid was determined in a 0.5% by weight solution in 96% by weight sulfuric acid at 25° C. according to EN ISO 307: 2007+Amd 1: 2013.

The glass transition temperatures and melting temperatures were determined according to ISO 11357-1: 2009, ISO 11357-2: 2013 and ISO 11357-3: 2011. For this purpose, two heating runs were conducted and the glass transition and melting temperatures were ascertained from the second heating run.

The densities of the polyamides were determined by the gas pycnometer method according to EN ISO 1183-3: 1999.

For determination of the proportion of polyamide 6.36 in the copolyamide, the copolyamide was hydrolyzed in dilute hydrochloric acid (20%). This protonates the units derived from hexamethylenediamine, with the chloride ion from the hydrochloric acid forming the counterion. By means of ion exchanger, this chloride ion was then exchanged for a hydroxide ion with release of hexamethylenediamine. By titration with 0.1 molar hydrochloric acid, the hexamethylenediamine concentration is then determined, from which the proportion of polyamide 6.36 in the copolyamide can be calculated.

Tear propagation resistance is determined according to Elmendorf, DIN ISO 6383-2: 2004 in extrusion direction (MD) and at right angles thereto (TD). The films were conditioned under standard climatic conditions for non-tropical countries according to DIN EN ISO 291: 2008.

Modulus of elasticity is determined according to ISO 527-3: 1995.

The impact resistance of the polymer film (P) was determined according to DIN ISO 7765-2: 1994 with 5 specimens at a relative air humidity of 50%, with reporting of the puncture energy in the present context.

Preparation of Films

For the preparation of certain films, the following polymers and metal components were used:

Polyamides

A-1 nylon-6 from BASF SE, sold under the Ultramid® B36L brand name, with a viscosity number of 218 mL/g, a glass transition temperature of 57° C., a melting temperature of 220° C. and a density of 1.153 g/mL.

Copolyamides with Dimer Acid:

C-1 A copolyamide of nylon-6 and polyamide 6.36, prepared by the following method:

932 kg of caprolactam (component (A)), 323.2 kg of Pripol® 1009 from Croda (C36 dimer acid, hydrogenated, component (B1)), 77.84 kg of 85% by weight hexamethylenediamine solution (component (B2)) in water and 153 kg of water were mixed in a 1930 L tank and blanketed with nitrogen. The outside temperature of the tank was heated to 290° C. and the mixture was stirred at this temperature for 11 hours. In the first 7 h the mixture was stirred at elevated pressure, in the next 4 hours under reduced pressure, during which water formed was distilled off. The copolyamide obtained was discharged from the tank, extruded and pelletized. The pellets of the copolyamide obtained were extracted with water at 95° C. for 4×6 hours and then dried at 90° C. to 140° C. in a nitrogen stream for 10 hours. The copolyamide obtained had a viscosity number of 259 mL/g, a glass transition temperature of 38° C. and a melting temperature of 188° C. The proportion of polyamide 6.36 in the copolyamide, based on the total weight of the copolyamide, was 30.3% by weight; the density was 1.076 g/mL.

Production of Monofilms by a Casting Process:

The monofilms LA-1, LA-2, LC-1 and LC-2, having the thicknesses as described below were prepared by extrusion of the respective polymers as described below on a Battenfeld cast extrusion line with an extruder of 45 mm in diameter and a throughput of 10 kg/h. The chill roll was cooled to 20° C. The films had a width of 250 mm.

LA-1: Nylon-6 film produced from polyamide A-1 in a thickness of 25 μm.

LA-2: Nylon-6 film produced from polyamide A-1 in a thickness of 95 μm.

LC-1: Copolyamide film produced from copolyamide C-1 in a thickness of 25 μm.

LC-2: Copolyamide film produced from copolyamide C-1 in a thickness of 95 μm.

Further Films were Commercially Obtained as Follows:

FPL-1: Aluminum film in 9 μm thickness and 250 mm width from Amcor Flexibles® Italia S.R.L.

FPL-2: Polyethylene terephthalate (PET) film in 12 μm thickness and 250 mm width from Mitsubishi® sold under the name Hostaphan® RNK.

FPL-3: Cast Polypropylene film in 60 μm thickness and 250 mm width from Mitsui Chemicals sold under the name RXC-22.

Preparation of Laminated Films (P)

The respective selection of above described films LA-1, LA-2, LC-1, LC-2, FPL-1, FPL-2 and FPL-3 as shown in the tables below, were sequentially laminated on a DRYTEC laboratory dryer in a film width of 250 mm and an oven length of 4 m with 4 g/m² glue (described below). The temperature of the first dryer was 80° C., the temperature of the second dryer was 60° C. The laminating speed was 20 m/min, and the lamination itself were run at 50° C. and a pressure of 5 bar with the glue Epotal® CF 605 containing 4.75% Basonat® LR 9056, both commercially available from BASF SE. After lamination, the film was run over a chill roll of 20° C.

The properties of the laminated films (P) are shown in Tables 1 to 3.

TABLE 1

| | | V1 | B2 |
|---|---|---|---|
| Film Structure | | FLP-2/LA-2 | FLP-2/LC-2 |
| Modulus of elasticity (MD) | [MPa] | 988 | 790 |
| Modulus of elasticity (TD) | [MPa] | 1010 | 840 |
| Tear propagation resistance (MD) | [mN] | 2980 (8N pendulum) | 3377 (8N pendulum) |
| Tear propagation resistance (TD) | [mN] | 1987 (8N pendulum) | 2754 (8N pendulum) |

TABLE 2

| | | V3 | B4 |
|---|---|---|---|
| Film Structure | | FLP-2/LA-1/FLP-3 | FLP-2/LC-1/FLP-3 |
| Modulus of elasticity (MD) | [MPa] | 1160 | 1050 |
| Modulus of elasticity (TD) | [MPa] | 1080 | 1040 |
| Tear propagation resistance (MD) | [mN] | 2394 (8N pendulum) | 10656 (32N pendulum) |
| Tear propagation resistance (TD) | [mN] | 1527 (8N pendulum) | 2061 (8N pendulum) |
| Puncture energy | [N] | 244 | 246 |

TABLE 3

| | | V5 | B6 |
|---|---|---|---|
| Film Structure | | FLP-2/FLP-1/LA-1/FLP-3 | FLP-2/FLP-1/LC-1/FLP-3 |
| Modulus of elasticity (MD) | [MPa] | 1060 | 991 |
| Modulus of elasticity (TD) | [MPa] | 1010 | 964 |
| Tear propagation resistance (MD) | [mN] | 1563 (8N pendulum) | 5593 (8N pendulum) |
| Tear propagation resistance (TD) | [mN] | 2593 (8N pendulum) | 3923 (8N pendulum) |
| Puncture energy | [N] | 230 | 258 |

As can be seen from the above Tables 1 to 3, at least the tear propagation resistances (MD, TD) of laminated films (P) containing LC-1, respectively LC-2, are significantly higher.

The invention claimed is:

1. A laminated multilayer polymer containing film (P) comprising at least one layer, the at least one layer consisting of at least one copolyamide,
   wherein the at least one copolyamide is prepared by polymerizing the following components:
   (A) 15% to 84% by weight of at least one lactam, and
   (B) 16% to 85% by weight of a monomer mixture (M) comprising the following components:
       (B1) at least one $C_{32}$-$C_{40}$ dimer acid, and
       (B2) at least one $C_4$-$C_{12}$ diamine,
   where the percentages by weight of components (A) and (B) are each based on the sum total weight of components (A) and (B), and
   wherein the laminated multilayer polymer containing film (P) further comprises at least one further layer, wherein the at least one further layer is at least one selected from the group consisting of
       (i) at least one further polymer (FP) selected from the group consisting of polyolefins, poly(ethylene-vinyl alcohols), poly(ethylene-vinyl acetates), polyethylene terephthalates, polyvinylidene chlorides, maleic anhydride-grafted polyolefins, polyesters, and ionomers, and
       (ii) aluminum metal and/or tin metal.

2. The laminated multilayer polymer containing film (P) according to claim 1, wherein component (A) is at least one selected from the group consisting of 3-aminopropanolactam, 4-aminobutanolactam, 5-aminopentanolactam, 6-aminohexanolactam, 7-aminoheptanolactam, 8-aminooctanolactam, 9-aminononanolactam, 10-aminodecanolactam, 11-aminoundecanolactam, and 12-aminododecanolactam.

3. The laminated multilayer polymer containing film (P) according to claim 1, wherein component (B) comprises in the range from 45 to 55 mol % of component (B1) and in the range from 45 to 55 mol % of component (B2), based in each case on the total molar amount of component (B).

4. The laminated multilayer polymer containing film (P) according to claim 1, wherein component (B2) is at least one selected from the group consisting of tetramethylenediamine, pentamethylenediamine, hexamethylenediamine, decamethylenediamine, and dodecamethylenediamine.

5. The laminated multilayer polymer containing film (P) according to claim 1, wherein component (B1) is prepared from at least one unsaturated fatty acid selected from the group consisting of an unsaturated $C_{16}$ fatty acid, an unsaturated $C_{18}$ fatty acid, and an unsaturated $C_{20}$ fatty acid.

6. The laminated multilayer polymer containing film (P) according to claim 1, wherein the at least one copolyamide has a viscosity number ($VN_{(C)}$) in the range from 150 to 300 ml/g, determined in a 0.5% by weight solution of the at least one copolyamide in a mixture of phenol/o-dichlorobenzene having a weight ratio of 1:1.

7. The laminated multilayer polymer containing film (P) according to claim 1, wherein the at least one copolyamide has a glass transition temperature ($T_{M(C)}$), in the range from 20 to 50° C.

8. The laminated multilayer polymer containing film (P) according to claim 1, wherein the at least one copolyamide has a melting temperature ($T_{M(C)}$), in the range from 150 to 210° C.

9. The laminated multilayer polymer containing film (P) according to claim 1, wherein the at least one further polymer (FP) is selected from the group consisting of polyolefins, poly(ethylene-vinyl acetates), and polyethylene terephthalates.

10. The laminated multilayer polymer containing film (P) according to claim 1, wherein the least one further layer, comprises
(i) the at least one further polymer (FP) selected from the group consisting of polyolefins, poly(ethylene-vinyl acetates), and polyethylene terephthalates, and
(ii) aluminum and/or tin metal.

11. The laminated multilayer polymer containing film (P) according to claim 1, comprising at least one outer layer comprising a polyolefin and at least one layer comprising aluminum and/or tin metal.

12. The laminated multilayer polymer containing film (P) according to claim 1, comprising:
one outer layer consisting essentially of polypropylene,
an adjacent next layer or layers comprising the at least one copolyamide,
a further layer of aluminum adjacent to the adjacent next layer or layers, and
finally adjacent to the further layer of aluminum, a layer of polyethylene terephthalate.

13. The laminated multilayer polymer containing film (P) according to claim 1, wherein the laminated multilayer polymer containing film (P) is produced by a lamination process of polymer layers which are obtained by at least one process selected from the group consisting of a casting process, a blowing process, and a biaxially orientation process.

14. The laminated multilayer polymer containing film (P) according to claim 1, wherein the laminated multilayer polymer containing film (P) has a thickness in the range from 0.1 μm to 1 mm.

15. The laminated multilayer polymer containing film (P) according to claim 1, wherein the at least one copolyamide is a random copolymer.

16. A process for producing a the laminated multilayer polymer containing film (P) according to claim 1, comprising the steps of
i) preparing at least two films, and
ii) laminating the at least two films,
wherein at least one film in step i) is obtained from a the at least one copolyamide as and the other film or films in step i) is/are obtained from a at least one component selected from the group consisting of
a) at least one further polymer (FP) selected from the group consisting of polyolefins, poly(ethylene-vinyl alcohols), poly(ethylene-vinyl acetates), polyethylene terephthalates, polyvinylidene chlorides, maleic anhydride-grafted polyolefins, polyesters, and ionomers, and
b) aluminum metal and/or tin metal.

17. A packaging film, comprising the laminated multilayer polymer containing film (P) according to claim 1.

18. A retortable packaging film, comprising the laminated multilayer polymer containing film (P) according to claim 1, wherein the laminated multilayer polymer containing film (P) comprises aluminum.

19. A laminated multilayer polymer containing film (P) consisting of:
(I) at least one layer consisting of at least one copolyamide,
wherein the at least one copolyamide is prepared by polymerizing the following components:
(A) 15% to 84% by weight of at least one lactam, and
(B) 16% to 85% by weight of a monomer mixture (M) comprising the following components:
(B1) at least one $C_{32}$-$C_{40}$ dimer acid, and
(B2) at least one $C_4$-$C_{12}$ diamine,
where the percentages by weight of components (A) and (B) are each based on the sum total weight of components (A) and (B), and
(II) at least one further layer, wherein the at least one further layer is at least one selected from the group consisting of
(i) at least one further polymer (FP) selected from the group consisting of polyolefins, poly(ethylene-vinyl alcohols), poly(ethylene-vinyl acetates), polyethylene terephthalates, polyvinylidene chlorides, maleic anhydride-grafted polyolefins, polyesters, and ionomers, and
(ii) aluminum metal and/or tin metal; and
(III) optionally one or more additives selected from the group consisting of stabilizers, dyes, antistats, tackifiers, anti-blockers, processing auxiliaries, antioxidants, light stabilizers, UV absorbers, lubricants, nucleating aids, and combinations thereof.

20. The laminated multilayer polymer containing film (P) according to claim 19, wherein the at least one further layer is selected from the group consisting of
(i) at least one further polymer (FP) selected from the group consisting of poly(ethylene-vinyl alcohols), poly(ethylene-vinyl acetates), polyethylene terephthalates, polyvinylidene chlorides, maleic anhydride-grafted polyolefins, polyesters, and ionomers, and
(ii) aluminum metal and/or tin metal.

\* \* \* \* \*